(12) United States Patent
Cho et al.

(10) Patent No.: US 11,325,657 B2
(45) Date of Patent: May 10, 2022

(54) BODY FOR VEHICLE

(71) Applicants: Hyundai Motor Company, Seoul (KR); Kia Motors Corporation, Seoul (KR)

(72) Inventors: Sun Hyung Cho, Suwon-si (KR); Tae Gyu Park, Hwaseong-si (KR); Chan Gu Kang, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/929,426

(22) Filed: Jul. 15, 2020

(65) Prior Publication Data

US 2021/0171122 A1    Jun. 10, 2021

(30) Foreign Application Priority Data

Dec. 5, 2019    (KR) .......................... 10-2019-0160982

(51) Int. Cl.
| | |
|---|---|
| *B62D 27/02* | (2006.01) |
| *B62D 25/04* | (2006.01) |
| *B62D 27/06* | (2006.01) |
| *B62D 25/06* | (2006.01) |
| *B62D 23/00* | (2006.01) |
| *B62D 21/15* | (2006.01) |

(52) U.S. Cl.
CPC ......... *B62D 27/023* (2013.01); *B62D 23/005* (2013.01); *B62D 25/04* (2013.01); *B62D 25/06* (2013.01); *B62D 27/02* (2013.01); *B62D 27/06* (2013.01); *B62D 21/15* (2013.01)

(58) Field of Classification Search
CPC .... B62D 27/02; B62D 27/023; B62D 27/026; B62D 27/0265; B62D 25/04; B62D 23/005
USPC ...................................... 296/29, 30; 293/102
See application file for complete search history.

(56) References Cited

U.S. PATENT DOCUMENTS

| | | |
|---|---|---|
| 4,325,448 A | 4/1982 | Pivar |
| 4,660,345 A | 4/1987 | Browning |
| 5,209,541 A | 5/1993 | Janotik |
| 5,332,281 A | 7/1994 | Janotik et al. |
| 5,549,352 A | 8/1996 | Janotik et al. |
| 5,829,219 A | 11/1998 | Sugawara et al. |
| 6,022,070 A | 2/2000 | Ashina et al. |
| 6,042,163 A | 3/2000 | Reiffer |
| 6,099,084 A | 8/2000 | Bungarten et al. |
| 6,241,310 B1 | 6/2001 | Patelczyk |
| 6,318,775 B1 | 11/2001 | Heatherington et al. |

(Continued)

FOREIGN PATENT DOCUMENTS

| | | |
|---|---|---|
| DE | 102005026791 A1 | 1/2007 |
| EP | 1329374 A1 | 7/2003 |

(Continued)

*Primary Examiner* — Dennis H Pedder
(74) *Attorney, Agent, or Firm* — Slater Matsil, LLP

(57) ABSTRACT

A body for a vehicle includes a bridge member having a pipe shape of an open cross-sectional structure in which one side thereof is opened, having end portions formed in a closed shape, and having an intermediate portion formed to be bent, and at least two members, wherein the bridge member is connected to a weak rigidity portion between the at least two members of the body.

19 Claims, 6 Drawing Sheets

(56) References Cited

U.S. PATENT DOCUMENTS

| | | | |
|---|---|---|---|
| 6,695,368 B1 * | 2/2004 | Weykamp | B60R 19/26 293/122 |
| 6,869,136 B2 | 3/2005 | Igarashi et al. | |
| 6,926,350 B2 | 8/2005 | Gabbianelli et al. | |
| 7,001,097 B2 | 2/2006 | Wang et al. | |
| 7,386,938 B2 | 6/2008 | Bruggemann et al. | |
| 7,758,107 B2 | 7/2010 | Ratsos et al. | |
| 8,371,642 B2 | 2/2013 | Baccouche et al. | |
| 8,640,814 B2 | 2/2014 | Deckard et al. | |
| 9,505,293 B2 | 11/2016 | Bowles et al. | |
| 9,849,920 B2 | 12/2017 | Kawata et al. | |
| 10,618,489 B2 | 4/2020 | Hisamura et al. | |
| 10,686,304 B2 | 6/2020 | Wagner, III | |
| 2001/0000119 A1 | 4/2001 | Jaekel et al. | |
| 2006/0059807 A1 | 3/2006 | Zimmerman et al. | |
| 2006/0192375 A1 | 8/2006 | Davis et al. | |
| 2009/0121106 A1 | 5/2009 | An | |
| 2013/0277137 A1 | 10/2013 | Kawaguchi et al. | |
| 2015/0252586 A1 | 9/2015 | Schaefer | |
| 2015/0259011 A1 | 9/2015 | Deckard et al. | |
| 2015/0298739 A1 | 10/2015 | Buschjohann et al. | |
| 2017/0136874 A1 | 5/2017 | Harris et al. | |
| 2019/0208741 A1 | 7/2019 | Huthmaker et al. | |
| 2021/0171125 A1 | 6/2021 | Yong et al. | |

FOREIGN PATENT DOCUMENTS

| | | |
|---|---|---|
| FR | 2822431 A1 | 9/2002 |
| GB | 2508075 A | 5/2014 |
| JP | H0411581 A | 1/1992 |
| JP | 2013208968 A | 10/2013 |
| KR | 100243584 B1 * | 3/2000 |
| KR | 20090035148 A | 4/2009 |
| WO | 2010071664 A1 | 6/2010 |

\* cited by examiner

BODY FOR VEHICLE

CROSS-REFERENCE TO RELATED APPLICATIONS

This application claims priority to Korean Patent Application No. 10-2019-0160982, filed on Dec. 5, 2019, which application is hereby incorporated herein by reference.

TECHNICAL FIELD

The present disclosure relates to a body for a vehicle simply assembled and having secured rigidity.

BACKGROUND

A monocoque body structure in which only a rear door portion is removed from a general vehicle design may be used in a body structure of a conventional compact vehicle.

However, this structure is a typical monocoque body structure in which only the rear door portion is removed, in which the vehicle body is manufactured by processing and welding its components through press processing using a mold. Therefore, such a body for a vehicle may not only require large-scale facility investments in press, body welding, painting factories and the like, but also may have low design freedom.

Moreover, a conventional body for a vehicle may require various design changes in case of producing products with diverse types in small quantities. Accordingly, the number of molds may also be significantly increased, thereby causing not only a high production cost but also difficulty in securing rigidity of the vehicle.

Accordingly, a proposal has been made to increase a thickness of a connection portion having weak rigidity among connection portions between members forming the body for a vehicle. As a thickness of the connection portion is increased, its weight is increased. However, rigidity of the connection portion is not significantly increased compared to its increased weight.

Therefore, a new body structure is required, the new body structure coping with various designs, improving vehicle assembly performance in a smart factory environment and effectively securing rigidity of the vehicle in particular.

The contents described in the background are provided only for assisting in the understanding for the background of the present disclosure and are not to be considered as corresponding to the related art known to those skilled in the art.

SUMMARY

An embodiment of the present disclosure provides a body for a vehicle simply assembled and having secured rigidity.

According to an embodiment of the present disclosure, a body for a vehicle includes a bridge member having a pipe shape of an open cross-sectional structure in which one side thereof is opened, having end portions formed in a closed shape and an intermediate portion formed to be bent, wherein the bridge member is connected to a weak rigidity portion having a relatively weaker rigidity among connection portions between members of the body.

One end and the other end of the bridge member may have side portions each fastened to a side of the connection portion between the members.

An outer curved surface of the intermediate portion of the bridge member may be formed to face the connection portion between the members.

The outer curved surface of the intermediate portion of the bridge member may be spaced apart from the connection portion between the members to form a space therebetween.

One end of the bridge member may be connected to a front end of a front pillar member extended from each of both front sides of the body toward a vehicle roof. The other end of the bridge member may be connected to an end of a front cross connection member connected between the front ends of both front pillar members, and the intermediate portion of the bridge member may be formed to face a connection portion between the front end of the front pillar member and the end of the front cross connection member.

One end of the bridge member may be connected to a rear end of the front pillar member extended from each of both front sides of the body toward the vehicle roof, and the other end of the bridge member may be connected to a front end of a rear pillar member extended from each of both rear sides of the body toward the vehicle roof. The intermediate portion of the bridge member may be formed to face a connection portion between the rear end of the front pillar member and the front end of the rear pillar member.

One end of the bridge member may be connected to a rear end of each of side reinforcement members extended from both front sides of the body to both rear sides of the body through lower portions of the body. The other end of the bridge member may be connected to an end of a rear cross connection member connected between both of the rear pillar members, and the intermediate portion of the bridge member may be formed to face a connection portion among the rear pillar member, the rear end of the side reinforcement member and the end of the rear cross connection member.

A fasten portion may be formed by extending an end of a side connection portion opposite to an opened side open portion of the bridge member, and the fasten portion may be folded toward the end of the bridge member to block an opening at the end of the bridge member.

A cross section of the fasten portion may be formed to match a cross section of the opening so that the fasten portion and the opening are joined to each other at a matched portion thereof.

A flange portion may be formed by folding each end portion of the side block portion connected to the side connection portion toward the side open portion.

DETAILED DESCRIPTION OF ILLUSTRATIVE EMBODIMENTS

An embodiment of the present disclosure is described in detail with reference to the accompanying drawings.

A bridge member 100 of an embodiment of the present disclosure may be used for a body 10 of an ultra-compact electric vehicle. In the ultra-compact electric vehicle, a plurality of bridge members 100 may be organically connected with each other to form a module for each portion, and the modules may be connected with each other to form the body 10 for a vehicle.

In particular, the bridge member 100 may be connected to a connection portion having relatively weaker rigidity among connection portions between the members of the body 10, thereby enabling the corresponding connection portion to have secured rigidity.

Figure 1:
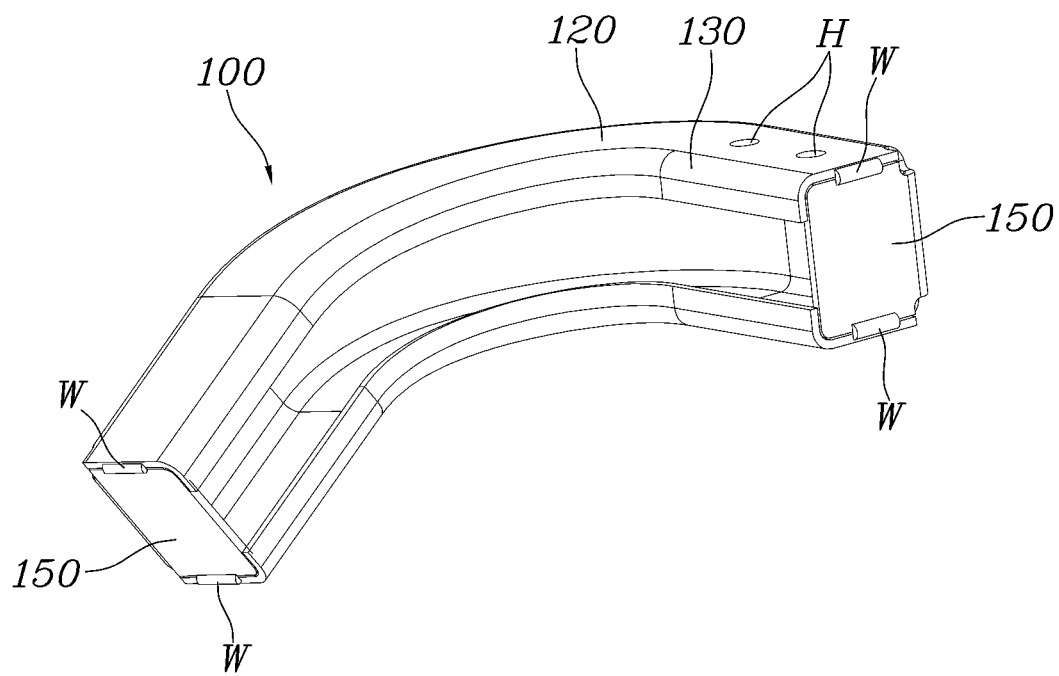
FIG. 1 is a view showing a shape of a bridge member according to embodiments of the present disclosure.
Figure 2:
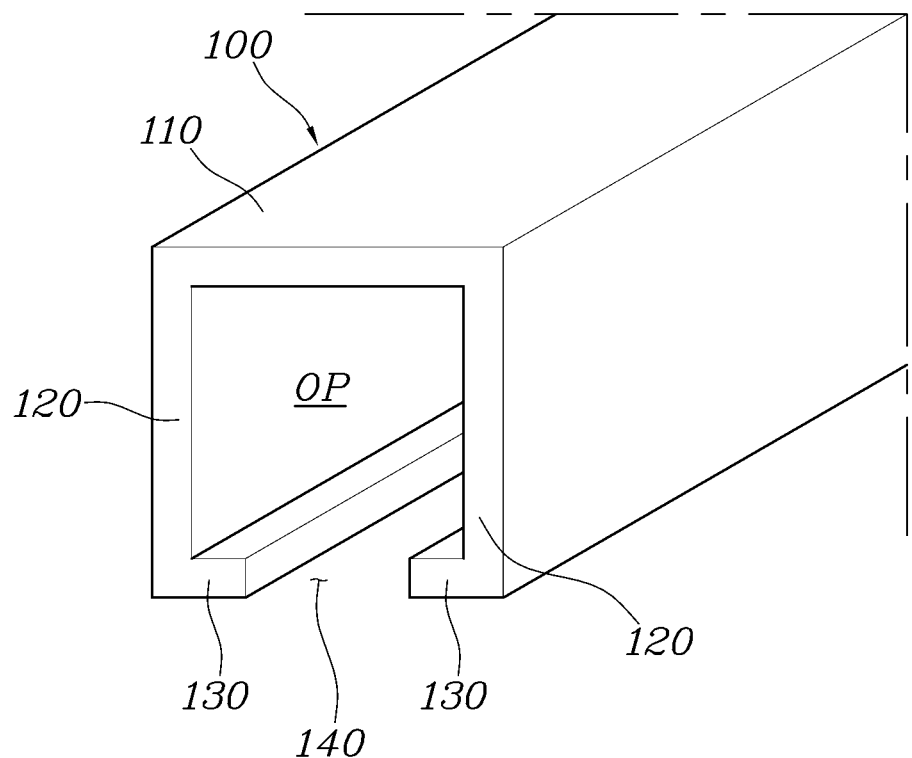
FIG. 2 is a view showing a cross-section of the bridge member according to embodiments of the present disclosure.

FIG. 1 is a view showing a shape of a bridge member 100 according to an embodiment of the present disclosure, and FIG. 2 is a view showing a cross-section of the bridge member 100 according to an embodiment of the present disclosure.

Referring to the drawing, the bridge member 100 of the present disclosure may have a pipe shape of an open cross-sectional structure in which one side thereof is opened.

In addition, the bridge member 100 may have both end portions formed in a closed shape and an intermediate portion formed to be bent to have a predetermined curvature or more.

For example, a C-shape may be a shape of a cross-section of the bridge member 100, which is perpendicular to a longitudinal direction of the bridge member 100. The bridge member 100 may thus have a structure in which the bridge member 100 has three closed surfaces and one open surface among its circumferential surfaces.

Such a bridge member 100 may be formed in a shape of a curved pipe having a bent intermediate portion. Alternatively, the bridge member 100 may be formed in a shape of a straight pipe elongated in the longitudinal direction, in which case the bridge member 100 may be used as a member forming a frame of the body 10 for a vehicle.

In particular, the bridge member 100 may be connected to a weak rigidity portion having a relatively weaker rigidity among connection portions between members of the body 10.

For example, the bridge member 100 may be used in a portion having relatively weaker torsional rigidity based on an analysis result of torsional rigidity of a vehicle for achieving improved durability and crash performance of the vehicle.

Figure 3:
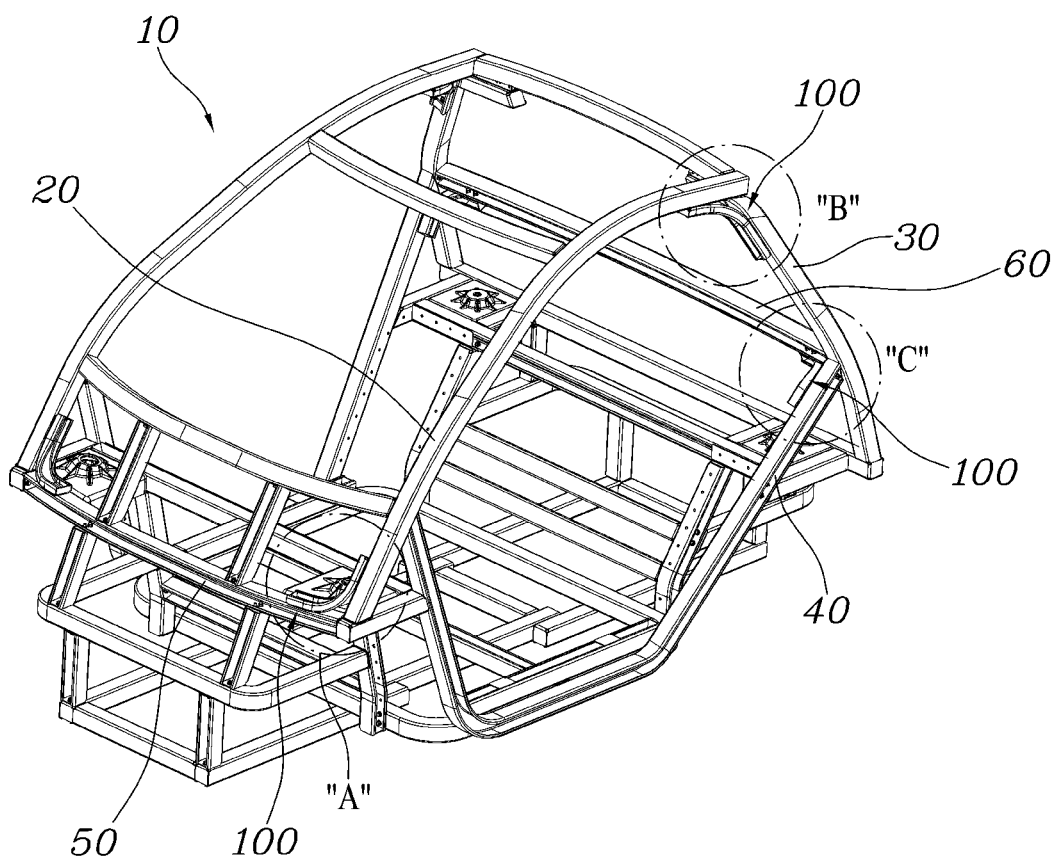
FIG. 3 is a view showing portions in which the bridge member is used in a body for a vehicle of embodiments of the present disclosure.

FIG. 3 is a view showing portions in which the bridge member 100 is used in a body 10 of embodiments of the present disclosure. Referring to the drawing, the bridge member 100 may be used in portions such as a connection portion between a front end of a front pillar member 20 and an end of a front cross connection member 50, a connection portion between a rear end of the front pillar member 20 and a front end of a rear pillar member 30, and a connection portion between the rear pillar member 30 and a rear end of a side reinforcement member 40.

However, the above connection portions are only examples, and the bridge member 100 may also be used in another connection portion having weak rigidity in addition to the above connection portions.

That is, the bridge member 100 having an open cross-sectional structure and thus having an open side, may be used as a joint. Therefore, the corresponding connection portion may have greatly improved rigidity while being prevented from having an increased thickness.

In particular, an expensive joint member made of die-cast aluminum is conventionally used in such a connection portion having the weak rigidity. However, in embodiments of the present disclosure, it is possible to manufacture the bridge member 100 having the C-shaped cross-section by folding and bending a plate-shaped material. In this manner, the bridge member 100 may be simply manufactured at a low cost and thus effectively cope with a smart factory environment.

In addition, the bridge member 100 may be bent to have only a different curvature, and may thus be simply used in a connection portion having another shape.

Referring to FIG. 1 again, one end and the other end of the bridge member 100 may have side portions each fastened to a side of the connection portion between the members.

For example, in the case of the connection portion between the front pillar member 20 and the rear pillar member 30, the side portion of one end of the bridge member 100 may be connected to the side portion of the front pillar member 20 using a fastening unit 160; and the side portion of the other end of the bridge member 100 may be connected to the side portion of the rear pillar member 30 using the fastening unit 160.

Here, the fastening unit 160 may be a bolt, a nut or a rivet. A fastening hole H may be formed to allow the bolt or rivet to penetrate therethrough and smoothly fasten the above side portions to each other. The fastening hole H may each be formed on three surfaces of all the side portions of the bridge member 100, which surround one end and the other end of the bridge member 100.

That is, in a state in which the side portion of the bridge member 100 is in surface-contact with a side of the member to be connected to the bridge member 100, the bolt may be inserted into the fastening hole H through an open side of the bridge member 100. Then, an in-line fastening operation may be performed to fasten the bolt using a tool. In this manner, the fastening operation of the bridge member 100 may be made easily and simply, thereby improving assembly performance of the body 10.

In addition, not only the bridge member 100 but also the members forming the body 10 may be assembled using a bolting or riveting method, and thus there may be no need for large-scale facilities including press, body welding, painting factories and the like. Therefore, it is possible not only to properly cope with the smart factory environment but also to simplify an assembly operation of the body 10, thereby improving the assembly performance of the body. In addition, an assembled portion may have greatly improved torsional rigidity, thereby securing strength and rigidity of the body 10.

Referring to FIG. 3 again, an outer curved surface of the intermediate portion of the bridge member 100 may be formed to face a connection portion between the members.

In particular, the outer curved surface of the intermediate portion of the bridge member 100 may be spaced apart from the connection portion between the members to form a space therebetween.

For example, in case of the connection portion between the front pillar member 20 and the rear pillar member 30, a middle of the intermediate portion of the bridge member 100, which is formed to be convex outward, may be formed to face the connection portion between the front pillar member 20 and the rear pillar member 30.

In addition, one end of the bridge member 100 may be connected to the front pillar member 20, and the other end of the bridge member 100 may be connected to the rear pillar member 30. Therefore, a triangular space may be formed between the convex portion of the intermediate portion of the bridge member 100 and the connection portion between the members facing the convex portion.

Accordingly, this triangular shaped connection portion may serve as the joint, and a load input to the corresponding connection portion may thus be properly dispersed and absorbed. In this manner, it is possible to secure rigidity of the corresponding connection portion.

Figure 4:
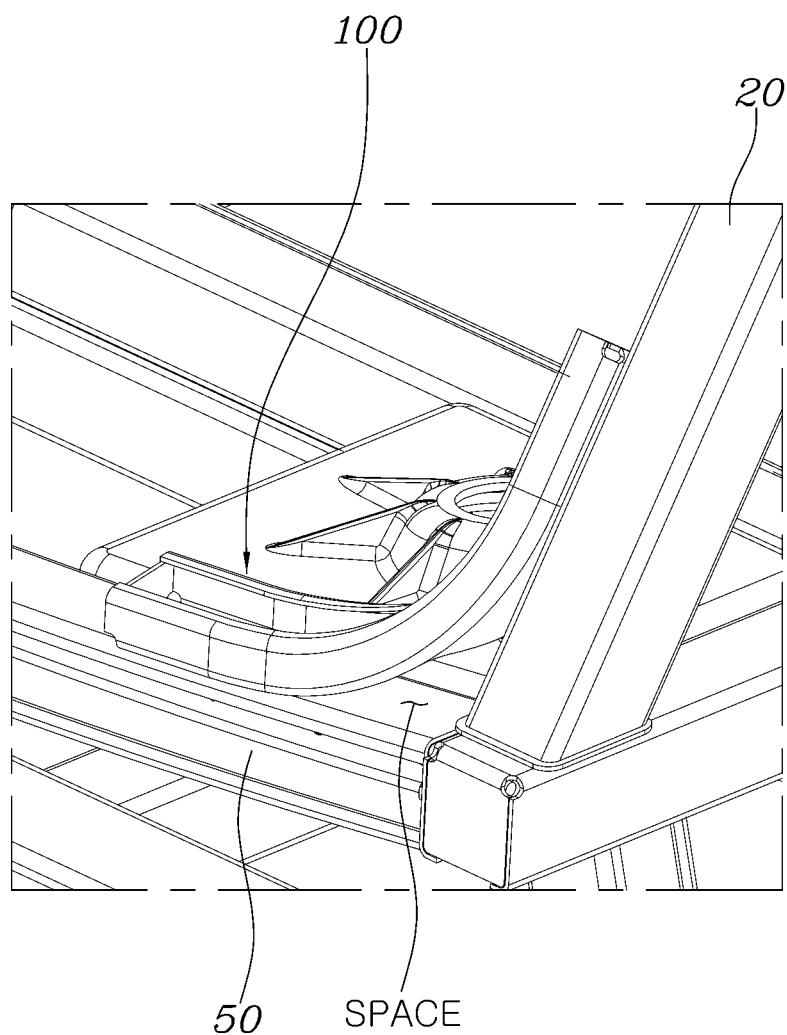
FIG. 4 is a view showing that the bridge member according to embodiments of the present disclosure is used in a connection portion between a front end of a front pillar member and an end of a front cross connection member.

Meanwhile, FIG. 4 is an enlarged view of a portion A of FIG. 3 and showing that the bridge member 100 according to embodiments of the present disclosure is used in the connection portion of the front end of the front pillar member 20.

Referring to the drawing, one end of the bridge member 100 may be connected to the front end of the front pillar member 20 extended from each of both front sides of the body 10 toward a vehicle roof, and the other end of the bridge member 100 may be connected to an end of a front cross connection member 50 connected between the front ends of both front pillar members 20.

In addition, the intermediate portion of the bridge member 100 may be formed to face the connection portion between the front end of the front pillar member 20 and the end of the front cross connection member 50.

That is, both end portions of the bridge member 100 may be respectively connected to the front pillar member 20 and the front cross connection member 50, and a bent portion of the bridge member 100 may face the connection portion between these members to form the triangular space. In this manner, the bridge member 100 may serve as the joint, thereby securing rigidity of the corresponding connection portion.

Here, a connection member described below, including the front cross connection member 50, may be used to connect a main member forming the frame of the vehicle and another connection member to each other. In addition, the connection member may be used in a portion assembling chassis, interior and exterior components to each other or in a local portion requiring rigidity reinforcement.

Figure 5:
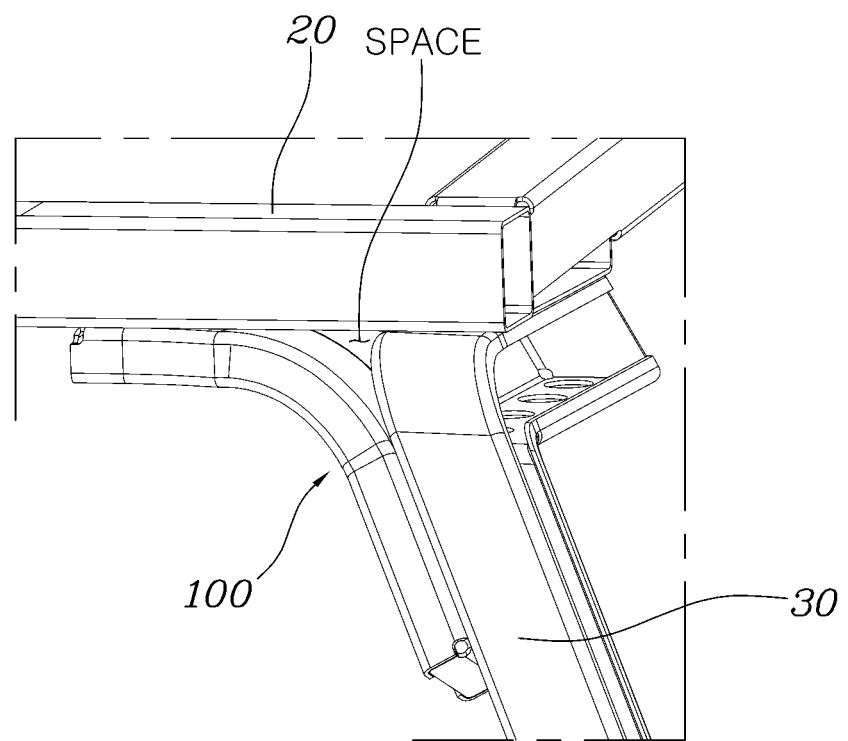
FIG. 5 is a view showing that the bridge member according to embodiments of the present disclosure is used in a connection portion between the front pillar member and a rear pillar member.

FIG. 5 is an enlarged view of a portion B of FIG. 3 and showing that the bridge member 100 according to embodiments of the present disclosure is used in the connection portion between the front pillar member 20 and the rear pillar member 30.

Referring to the drawing, one end of the bridge member 100 may be connected to the rear end of the front pillar member 20 extended from each of both front sides of the body 10 toward the vehicle roof, and the other end of the bridge member 100 may be connected to the front end of the rear pillar member 30 extended from each of both rear sides of the body 10 toward the vehicle roof.

In addition, the intermediate portion of the bridge member 100 may be formed to face the connection portion between the rear end of the front pillar member 20 and the front end of the rear pillar member 30.

That is, both end portions of the bridge member 100 may be respectively connected to the front pillar member 20 and the rear pillar member 30, and a bent portion of the bridge member 100 may face the connection portion between these members to form the triangular space. In this manner, the bridge member 100 may serve as the joint, thereby securing rigidity of the corresponding connection portion.

Figure 6:
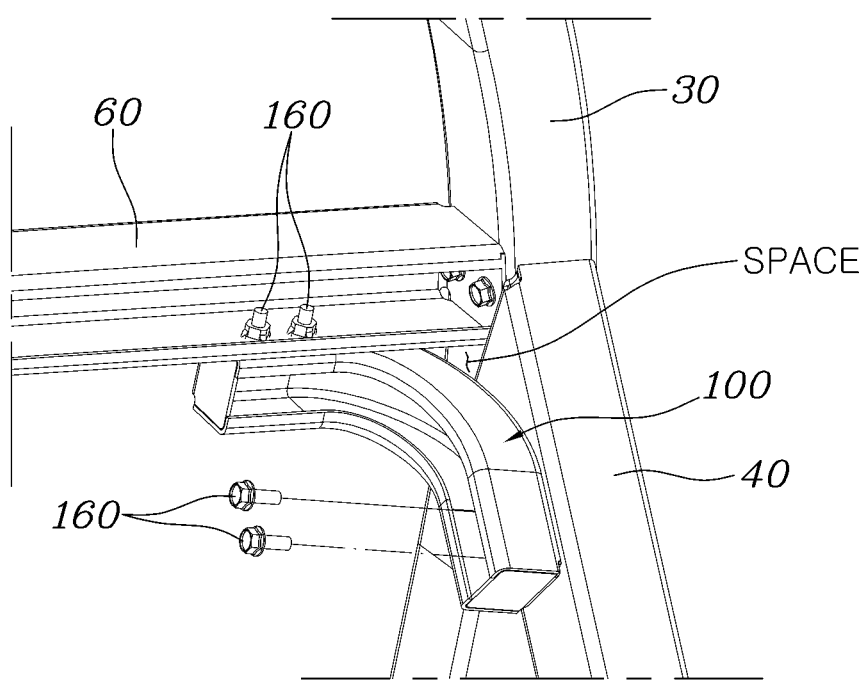
FIG. 6 is a view showing that the bridge member according to embodiments of the present disclosure is used in a connection portion between the rear pillar member and an end of a side reinforcement member.

FIG. 6 is an enlarged view of a portion C of FIG. 3 and showing that the bridge member 100 according to embodiments of the present disclosure is used in the connection portion of the rear end of the rear pillar member 30.

Referring to the drawing, one end of the bridge member 100 may be connected to a rear end of each of the side reinforcement members 40 extended from both front sides of the body 10 to both rear sides of the body 10 through lower portions of the body 10, and the other end of the bridge member 100 may be connected to an end of a rear cross connection member 60 connected between rear ends of both the rear pillar members 30.

In addition, the intermediate portion of the bridge member 100 may be formed to face the connection portion among the rear pillar member 30, the rear end of the side reinforcement member 40 and the end of the rear cross connection member 60.

That is, both end portions of the bridge member 100 may be respectively connected to the side reinforcement member 40 and the rear cross connection member 60, and a bent portion of the bridge member 100 may face the connection portion between these members to form the triangular space. In this manner, the bridge member 100 may serve as the joint, thereby securing rigidity of the corresponding connection portion.

Meanwhile, FIG. 2 is a view showing a cross-section of the bridge member 100 according to an embodiment of the present disclosure.

Referring to FIGS. 1, 2 and 3, a fasten portion 150 may be formed by extending an end of a side connection portion 110 opposite to an opened side open portion 140 of the bridge member 100.

In addition, the fasten portion 150 may be folded toward the end of the bridge member 100 to block an opening OP at the end of the bridge member 100.

For example, both ends of the side connection portion 110 may be formed longer than both ends of a side block portion 120 in the longitudinal direction, and each of the elongated portions may become the fasten portion 150.

Accordingly, the side block portion 120 formed on each of both sides of the side connection portion 110 may be folded in a perpendicular direction with respect to the side connection portion 110, and the fasten portions 150 may each be folded at a portion of the side connection portion 110 bordered with an end of the side block portion 120 and block the opening OP at each of both end portions of the bridge member 100.

That is, a portion of the fasten portion 150 may be formed integrally with the bridge member 100 and thus secure rigidity of the fasten portion 150. In addition, the bridge member 100 may be manufactured by folding and bending the fasten portion 150. Therefore, the bridge member 100 may be simply manufactured at a low cost and thus effectively cope with the smart factory environment.

In addition, as shown in FIG. 1, a cross section of the fasten portion 150 may be formed to match a cross section of the opening OP so that the fasten portion 150 and the opening OP are joined to each other at a matched portion thereof.

For example, the fasten portion 150 may be formed in a square shape. An outer edge of the fasten portion 150 may be formed in a shape corresponding to an inner edge of the opening OP and then the fasten portion 150 may be folded. In a state in which the fasten portion 150 is folded, the fasten portion 150 and the opening OP may be welded and joined to each other by performing a $CO_2$ welding or the like on a portion where the outer edge of the fasten portion 150 meets the inner edge of the opening OP. In this manner, the fasten portion 150 may have secured rigidity.

However, a cross-sectional area of the fasten portion 150 may be formed in a shape of a plate having an area greater than that of the opening OP. In this case, the fasten portion 150 and the opening OP may be welded and joined to each other by performing the welding along a line where the fasten portion 150 contacts the opening OP.

In addition, referring to FIG. 2, a flange portion 130 may be formed by folding each end portion of the side block portion 120 connected to the side connection portion no toward the side open portion 140.

For example, the flange portions 130 may be formed in such a manner that the end portions of both side block portions 120 may be partially folded in directions opposite to each other, respectively.

That is, the flange portion 130 may be formed in a shape bent from the side block portion 120 toward the side open portion 140, and the end portions of the side block portion 120 may thus have secured rigidity.

As described above, in the present disclosure, the bridge member 100 may be used as the joint, the bridge member 100 having the open cross-sectional structure in which one side thereof is opened. Therefore, the corresponding connection portion may have greatly improved rigidity while being prevented from having an increased thickness. In addition, it is possible to manufacture the bridge member 100 by folding and bending the plate-shaped material. In this manner, the bridge member 100 may be simply manufactured at a low cost and thus effectively cope with the smart factory environment.

In addition, the bridge member 100 may be bent to have a different curvature, and may thus be simply used in a connection portion formed in another shape. Accordingly, the bridge member 100 may cope with various designs of the body 10.

In addition, the in-line fastening operation may be performed to fasten the bolt using a tool through the opened side of the bridge member 100. In this manner, the fastening operation of the bridge member 100 may be made easily and simply, thereby improving assembly performance of the body 10.

In addition, not only the bridge member 100 but also the members forming the body m may be assembled using the bolting or riveting method, and thus there may be no need for the large-scale facilities including the press, body welding, and painting factories and the like. Therefore, it is possible not only to properly cope with the smart factory environment but also to simplify the assembly operation of the body 10, thereby improving the assembly performance of the body. In addition, the assembled portion may have greatly improved torsional rigidity, thereby securing strength and rigidity of the body 10.

Although specific examples of the present disclosure are described above in detail, it is obvious to those skilled in the art that various modifications and alterations may be made without departing from the spirit and scope of the present disclosure. In addition, it is obvious that these modifications and alterations are within the following claims.

What is claimed is:

1. A body for a vehicle comprising:
    a bridge member having a pipe shape of an open cross-sectional structure in which one side thereof is opened, having end portions formed in a closed shape, and having an intermediate portion formed to be bent; and
    at least two members, wherein the bridge member is connected to a weak rigidity portion between the at least two members of the body, wherein a first end and a second end of the bridge member have side portions each fastened to a side of a connection portion between the at least two members.

2. The body for the vehicle of claim 1, wherein an outer curved surface of the intermediate portion of the bridge member is formed to face a connection portion between the at least two members.

3. The body for the vehicle of claim 2, wherein the outer curved surface of the intermediate portion of the bridge member is spaced apart from the connection portion between the at least two members to form a space therebetween.

4. The body for the vehicle of claim 1, further comprising two front pillar members each extending from a respective front side of the body toward a vehicle roof and each having a front end, wherein:
    a first end of the bridge member is connected to the front end of one of the front pillar members;
    a second end of the bridge member is connected to an end of a front cross connection member connected between the front ends of the front pillar members; and
    the intermediate portion of the bridge member is formed to face a connection portion between the front end of the one of the front pillar members and the end of the front cross connection member.

5. The body for the vehicle of claim 1, further comprising:
    two front pillar members each extending from a respective front side of the body toward a vehicle roof and each having a rear end; and
    two rear pillar members each extending from a respective rear side of the body toward the vehicle roof and each having a front end, wherein:
    a first end of the bridge member is connected to the rear end of one of the front pillar members;
    a second end of the bridge member is connected to a front end of one of the rear pillar members; and
    the intermediate portion of the bridge member is formed to face a connection portion between the rear end of the one of the front pillar members and the front end of the one of the rear pillar members.

6. The body for the vehicle of claim 1, further comprising two rear pillar members, each rear pillar member extended from a respective rear side of the body toward a vehicle roof, wherein:
    a first end of the bridge member is connected to a rear end of a side reinforcement member extended from a front side of the body to a rear side of the body through a lower portion of the body;
    a second end of the bridge member is connected to an end of a rear cross connection member connected between the rear pillar members; and
    the intermediate portion of the bridge member is formed to face a connection portion among one of the rear pillar members, the rear end of the side reinforcement member, and the end of the rear cross connection member.

7. The body for the vehicle of claim 1, further comprising a fasten portion, wherein the fasten portion is folded toward an end of the bridge member to block an opening at the end of the bridge member.

8. The body for the vehicle of claim 7, wherein a cross section of the fasten portion is formed to match a cross section of the opening, and wherein the fasten portion and the opening are joined to each other at a matched portion of each.

9. The body for the vehicle of claim 7, further comprising a flange portion formed by folding each end portion of a side block portion connected to a side connection portion toward the opened side.

10. A body for a vehicle comprising:
a bridge member having a pipe shape of an open cross-sectional structure in which one side thereof is opened, having end portions formed in a closed shape, and having an intermediate portion formed to be bent;
at least two members, wherein the bridge member is connected to a weak rigidity portion between the at least two members of the body; and
two front pillar members each extending from a respective front side of the body toward a vehicle roof and each having a front end;
wherein a first end of the bridge member is connected to the front end of one of the front pillar members;
wherein a second end of the bridge member is connected to an end of a front cross connection member connected between the front ends of the front pillar members; and
wherein the intermediate portion of the bridge member is formed to face a connection portion between the front end of the one of the front pillar members and the end of the front cross connection member.

11. The body for the vehicle of claim 10, wherein an outer curved surface of the intermediate portion of the bridge member is formed to face a connection portion between the at least two members.

12. The body for the vehicle of claim 11, wherein the outer curved surface of the intermediate portion of the bridge member is spaced apart from the connection portion between the at least two members to form a space therebetween.

13. The body for the vehicle of claim 10, further comprising:
the two front pillar members each extending from a respective front side of the body toward a vehicle roof and each having a rear end; and
two rear pillar members each extending from a respective rear side of the body toward the vehicle roof and each having a front end, wherein:
a first end of the bridge member is connected to the rear end of one of the front pillar members;
a second end of the bridge member is connected to a front end of one of the rear pillar members; and
the intermediate portion of the bridge member is formed to face a connection portion between the rear end of the one of the front pillar members and the front end of the one of the rear pillar members.

14. The body for the vehicle of claim 10, further comprising two rear pillar members, each rear pillar member extended from a respective rear side of the body toward a vehicle roof, wherein:

a first end of the bridge member is connected to a rear end of a side reinforcement member extended from a front side of the body to a rear side of the body through a lower portion of the body;
a second end of the bridge member is connected to an end of a rear cross connection member connected between the rear pillar members; and
the intermediate portion of the bridge member is formed to face a connection portion among one of the rear pillar members, the rear end of the side reinforcement member, and the end of the rear cross connection member.

15. The body for the vehicle of claim 10, further comprising a fasten portion, wherein the fasten portion is folded toward an end of the bridge member to block an opening at the end of the bridge member.

16. The body for the vehicle of claim 15, wherein a cross section of the fasten portion is formed to match a cross section of the opening, and wherein the fasten portion and the opening are joined to each other at a matched portion of each.

17. The body for the vehicle of claim 15, further comprising a flange portion formed by folding each end portion of a side block portion connected to a side connection portion toward the opened side.

18. A body for a vehicle comprising:
a bridge member having a pipe shape of an open cross-sectional structure in which one side thereof is opened, having end portions formed in a closed shape, and having an intermediate portion formed to be bent;
at least two members, wherein the bridge member is connected to a weak rigidity portion between the at least two members of the body;
two front pillar members each extending from a respective front side of the body toward a vehicle roof and each having a rear end; and
two rear pillar members each extending from a respective rear side of the body toward the vehicle roof and each having a front end, wherein:
a first end of the bridge member is connected to the rear end of one of the front pillar members;
a second end of the bridge member is connected to a front end of one of the rear pillar members; and
the intermediate portion of the bridge member is formed to face a connection portion between the rear end of the one of the front pillar members and the front end of the one of the rear pillar members.

19. The body for the vehicle of claim 1, wherein an outer curved surface of the intermediate portion of the bridge member is formed to face a connection portion between the at least two members.

* * * * *